United States Patent
Hollis

(10) Patent No.: US 10,353,668 B2
(45) Date of Patent: *Jul. 16, 2019

(54) ASYMMETRIC CHIP-TO-CHIP INTERCONNECT

(71) Applicant: Micron Technology, Inc., Boise, ID (US)

(72) Inventor: Timothy M. Hollis, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/431,421

(22) Filed: Feb. 13, 2017

(65) Prior Publication Data

US 2017/0177301 A1 Jun. 22, 2017

Related U.S. Application Data

(60) Continuation of application No. 14/635,618, filed on Mar. 2, 2015, now Pat. No. 9,571,602, which is a
(Continued)

(51) Int. Cl.
*G06F 5/06* (2006.01)
*G06F 13/38* (2006.01)
(Continued)

(52) U.S. Cl.
CPC .............. *G06F 5/06* (2013.01); *G06F 13/38* (2013.01); *G06F 13/385* (2013.01);
(Continued)

(58) Field of Classification Search
None
See application file for complete search history.

(56) References Cited

U.S. PATENT DOCUMENTS 7,054,988 B2  5/2006  Hils
7,330,514 B1  2/2008  Ahmad
(Continued)

OTHER PUBLICATIONS

Casper, B., et al., "A 20Gb/s Forwarded Clock Transceiver in 90nm CMOS", IEEE Int'l Solid-State Circuits Conference, 4,6, (2006), 10 pgs.
(Continued)

*Primary Examiner* — Henry Tsai
*Assistant Examiner* — Aurangzeb Hassan
(74) *Attorney, Agent, or Firm* — Schwegman Lundberg & Woessner, P.A.

(57) ABSTRACT

Methods and apparatuses to transfer data between a first device and a second device are disclosed. In various embodiments, an apparatus includes a first device and a second device. The first device includes at least one first non-differential transmitter coupled to a first channel, at least one second non-differential transmitter coupled to a second channel, and at least one differential receiver to receive a data bit and its complement on the first and second channels in parallel. The second device includes at least one first non-differential receiver coupled to the first channel, at least one second non-differential receiver coupled to the second channel, and at least one differential transmitter to transmit a data bit and its complement on the first and second channels in parallel. Other methods and apparatuses are disclosed.

16 Claims, 12 Drawing Sheets

Related U.S. Application Data continuation of application No. 13/621,063, filed on Sep. 15, 2012, now Pat. No. 8,972,632, which is a division of application No. 11/972,209, filed on Jan. 10, 2008, now Pat. No. 8,291,139.

(51) Int. Cl.
- *G06F 13/42* (2006.01)
- *H04L 12/40* (2006.01)
- *H04L 25/02* (2006.01)
- *H04L 29/08* (2006.01)

(52) U.S. Cl.
CPC ...... *G06F 13/4273* (2013.01); *H04L 12/4013* (2013.01); *H04L 25/0272* (2013.01); *H04L 67/288* (2013.01); *H04Q 2213/13036* (2013.01); *H04Q 2213/13305* (2013.01)

(56) References Cited

U.S. PATENT DOCUMENTS

| | | |
|---|---|---|
| 8,291,139 B2 | 10/2012 | Hollis |
| 8,972,632 B2 | 3/2015 | Hollis |
| 9,571,602 B2 | 2/2017 | Hollis |
| 2004/0210703 A1 | 10/2004 | Hils |
| 2005/0073968 A1* | 4/2005 | Perlman ............ H04L 63/0428 370/315 |
| 2005/0135489 A1 | 6/2005 | Ho et al. |
| 2005/0242843 A1* | 11/2005 | Meltzer ............. H03D 13/004 327/47 |
| 2008/0162071 A1 | 7/2008 | Stevens et al. |
| 2009/0063717 A1 | 3/2009 | Bohm et al. |
| 2009/0182909 A1 | 7/2009 | Hollis |
| 2009/0225818 A1* | 9/2009 | Dapper ................ G06F 17/14 375/222 |
| 2013/0022137 A1 | 1/2013 | Hollis |
| 2015/0180994 A1 | 6/2015 | Hollis |

OTHER PUBLICATIONS

Jaussi, J., et al., "A 20Gb/s Embedded Clock Transceiver in 90nm CMOS", IEEE Int'l Solid-State Circuits Conference, 18.8, (2006), 10 pgs.

U.S. Appl. No. 11/972,209, Non Final Office Action dated Apr. 1, 2010, 11 pgs.

U.S. Appl. No. 11/972,209, Response filed Jun. 28, 2010 to Non Final Office Action dated Apr. 1, 2010, 9 pgs.

U.S. Appl. No. 11/972,209, Final Office Action dated Sep. 15, 2010, 8 pgs.

U.S. Appl. No. 11/972,209, Response filed Feb. 10, 2011 to Final Office Action, 11 pgs.

U.S. Appl. No. 11/972,209, Non Final Office Action dated Mar. 30, 2011, 9 pgs.

U.S. Appl. No. 11/972,209, Response filed Jun. 29, 2011 to Non Final Office Action dated Mar. 30, 2011, 10 pgs.

U.S. Appl. No. 11/972,209, Final Office Action dated Dec. 19, 2011, 9 pgs.

U.S. Appl. No. 11/972,209, Notice of Allowance dated Jun. 13, 2012, 7 pgs.

U.S. Appl. No. 13/621,063, Non Final Office Action dated Aug. 20, 2013, 7 pgs.

U.S. Appl. No. 13/621,063, Response filed Nov. 20, 2013 to Non Final Office Action dated Aug. 20, 2013, 12 pgs.

U.S. Appl. No. 13/621,063, Final Office Action dated Mar. 13, 2014, 9 pgs.

U.S. Appl. No. 13/621,063, Response filed Jun. 12, 2014 to Final Office Action dated Mar. 13, 2014, 13 pgs.

U.S. Appl. No. 13/621,063, Advisory Action dated Jul. 11, 2014, 3 pgs.

U.S. Appl. No. 13/621,063, Notice of Allowance dated Oct. 23, 2014, 11 pgs.

U.S. Appl. No. 13/621,063, Corrected Notice of Allowance dated Dec. 19, 2014, 8 pgs.

U.S. Appl. No. 13/621,063; Corrected Notice of Allowance dated Jan. 14, 2015, 8 pgs.

U.S. Appl. No. 14/635,618, Preliminary Amendment filed Mar. 4, 2015, 9 pgs.

U.S. Appl. No. 14/635,618, Non Final Office Action dated Dec. 21, 2015, 9 pgs.

U.S. Appl. No. 14/635,618, Response filed Apr. 19, 2016 to Non Final Office Action dated Dec. 21, 2015, 12 pgs.

U.S. Appl. No. 14/635,618, Notice of Allowance dated Sep. 27, 2016, 7 pgs.

\* cited by examiner

US 10,353,668 B2

ASYMMETRIC CHIP-TO-CHIP INTERCONNECT

PRIORITY APPLICATION

This Application is a continuation of U.S. application Ser. No. 14/635,618, filed Mar. 2, 2015, which is a continuation of U.S. application Ser. No. 13/621,063, filed Sep. 15, 2012, now issued as U.S. Pat. No. 8,972,632, which is a divisional application of U.S. application Ser. No. 11/972,209, filed Jan. 10, 2008, now issued as U.S. Pat. No. 8,291,139, all of which are incorporated herein by reference in their entireties.

FIELD OF THE INVENTION

Embodiments of this invention relate to, for example, asymmetric signaling over a parallel data bus, which can improve data reception reliability.

BACKGROUND

Circuit designers of multi-Gigabit systems face a number of challenges as advances in technology mandate increased performance in high-speed components and systems. At a basic level, data transmission between components within a single semiconductor device, or between two devices on a printed circuit board, may be represented by the system 10 shown in FIG. 1A. (Accordingly, as used herein, a "device" can refer to a discrete device, such as a microprocessor or memory controller, or a component of a device, such as an integrated circuit or a functional block, for example). In FIG. 1A, data is transferred (e.g., forwarded, returned, transmitted, sent, and/or received) between a first device 12 and a second device 14 along (e.g., across, carried by, over, on, through and/or via) channels 16 (e.g., copper traces on a printed circuit board or "on-chip" in a semiconductor device). A standard interconnect approach is shown, in which each channel 16 carries a particular bit (D0, D1, etc.) in the parallel stream of data being transmitted. (This is sometimes known in the industry as a "single-ended" approach). Because either device 12 or 14 may act as the transmitter or receiver of data at any point in time, each channel 16 in each device contains both a transmitter (tx) and a receiver (rx), each operating in accordance with a clock signal, Clk. This clock signal, Clk, can comprise a forwarded clock which, as its name suggests, is forwarded on its own channel 16 from the transmitting device to the receiving device so as to synchronize with the transmitted data. Alternatively, the clock, if not transmitted on its own channel, may be derived at the receiving device via clock data recovery (CDR) techniques, which are well known in the art and well understood by those of skill in the art. A differential clock could also be used in which true clock and complement clock are sent over two channels, which can be useful to minimize clock jitter, as is well known.

A typical receiver circuit used in conjunction with the standard interconnect approach of FIG. 1A is shown in FIG. 1B. The receiver circuit comprises an amplifier stage 20 whose output is coupled to a latch 22, which as illustrated comprises cross-coupled NAND gates. The input to the amplifier stage 20 comprises the data as received (DataIn), which is compared to a reference voltage (Vref), which is typically a midpoint voltage of one-half of the receiving device's power supply (i.e., ½ Vdd). When enabled by the clock, Clk, the amplifier stage resolves and amplifies the difference between the received data, DataIn, and the reference voltage, Vref, as is well known.

Another approach used to transmit data via a parallel bus is a differential interconnect approach, which is illustrated in FIG. 2A. In this approach, a given bit (D0, D1, etc.) is always transmitted along with its complement (D0#, D1#, etc.). As a result, a pair of channels 16 must be dedicated to each bit, one channel carrying true data, and the other, its complement. To accommodate this architecture, a transmitter circuit and receiver circuit are shared between each pair of channels, as shown. The receiver circuit used in the differential interconnect approach is shown in FIG. 2B, and is essentially the same as that illustrated in FIG. 1B, except that the complementary data state (DataIn#) is used in lieu of the reference voltage, Vref.

The differential interconnect approach of FIG. 2 has the effect of making data resolution more reliable when compared to the standard interconnect approach of FIG. 1. Such increased reliability results from at least three effects. First, because the receiver circuitry (FIG. 2B) uses complementary inputs, the voltage margin of the amplifier stage 20 is increased, which leads to faster, more reliable resolution of the data state by the receiver circuitry. Second, because true data is always transmitted along with its complementary data, cross talk-by which one channel perturbs data on an adjacent channel 16 in the bus-is minimized. Third, a non-differential signal is more susceptible to simultaneous switching output (SSO) noise generated at both the transmitters and receivers. Furthermore, in addition to the increased SSO rejection capability of differential interconnects, the very nature of the typical differential driver minimizes the generation of SSO.

However, increased sensing reliability in the differential interconnect approach comes at an obvious price, namely the doubling of the number of channels 16 needed to complete the parallel bus. To offset this, and keep the number of channels 16 constant, the clock, Clk, used in the differential interconnect approach is generally faster than would be used in the standard interconnect approach. Indeed, if the clock used is twice as fast, it will be appreciated that the number of bits transmitted per channel 16, i.e., the data capacity, is equivalent between the two approaches. Fortunately, increased sensing capability in the differential interconnect approach allows for higher clock speed to be used effectively, and clock speed even higher than double speed could be used.

As well as providing for both standard and differential interconnect approaches, the prior art also provides for data to be received with "multiphase, fractional-rate receivers," such as is shown in FIGS. 3A, 3B, and 4. FIG. 3A, for example, shows multiphase, fractional-rate receivers used in the standard interconnect approach. Suppose four sequential bits of data (e.g., Da, Db, Dc, Dd) are transmitted across a given channel (e.g., $16_3$) on both the rising and falling edge of a clock, Clk, in what would be known as a Double Data Rate (DDR) application. Each of these four bits is captured at its own receiver (rx) by one of a plurality of phase-shifted, fractional-rate clocks. Because four bits are to be sensed in this example, four clocks of four distinct phases, Clk(a), Clk(b), Clk(c), and Clk(d) are used to sense data Da, Db, Dc, and Dd at each of the receivers.

As shown in FIG. 3B, the phase-shifted, fractional-rate clocks Clk(x) are typically generated from the master clock, Clk, using known techniques. Each generated phase-shifted, fractional-rate clock, Clk(x), is a fraction of the frequency of the master clock, e.g., a quarter-rate or half-rate clock. Data capture at the receivers can occur on both the rising and falling edges of each clock, or on either the rising edge or falling edges of each clock. For example, and assuming that four receivers are used to sample the four bits, either a quarter-rate clock which samples on rising and falling edges (18a) or a half-rate clock which samples on the rising edges only (18b) can be used. However, the number of fractional-rate receivers can be varied to the same effect. Thus, eight quarter-rate clocks combined with eight fractional-rate receivers could be used to sample the data only on rising edges (18c), or two half-rate clocks used with two fractional-rate receivers could be used to sample the data on rising and falling edges (18d).

Multiphase, fractional-rate clocks at the receiver are useful in situations where data can be transmitted at a rate faster than the receiver can resolve the data state. For example, when a quarter-rate clock is used, the receiver essentially has four times longer to properly resolve the data state, which is beneficial because it can take significant time for the amplifier stage 20 in the receiver (FIG. 1B, 2B) to amplify and resolve the data state. Fractional-rate clocks at the receiver can also be used in differential interconnect approaches, such as is illustrated in FIG. 4. As the operation of FIG. 4 should be apparent by extension from the foregoing explanations, it is not further discussed.

While any of the above approaches can be used in the transmission of data through a parallel bus, the use of any one approach may not be optimal, a point discussed further below. This disclosure presents a more optimal solution.

DETAILED DESCRIPTION

Figure 1A:
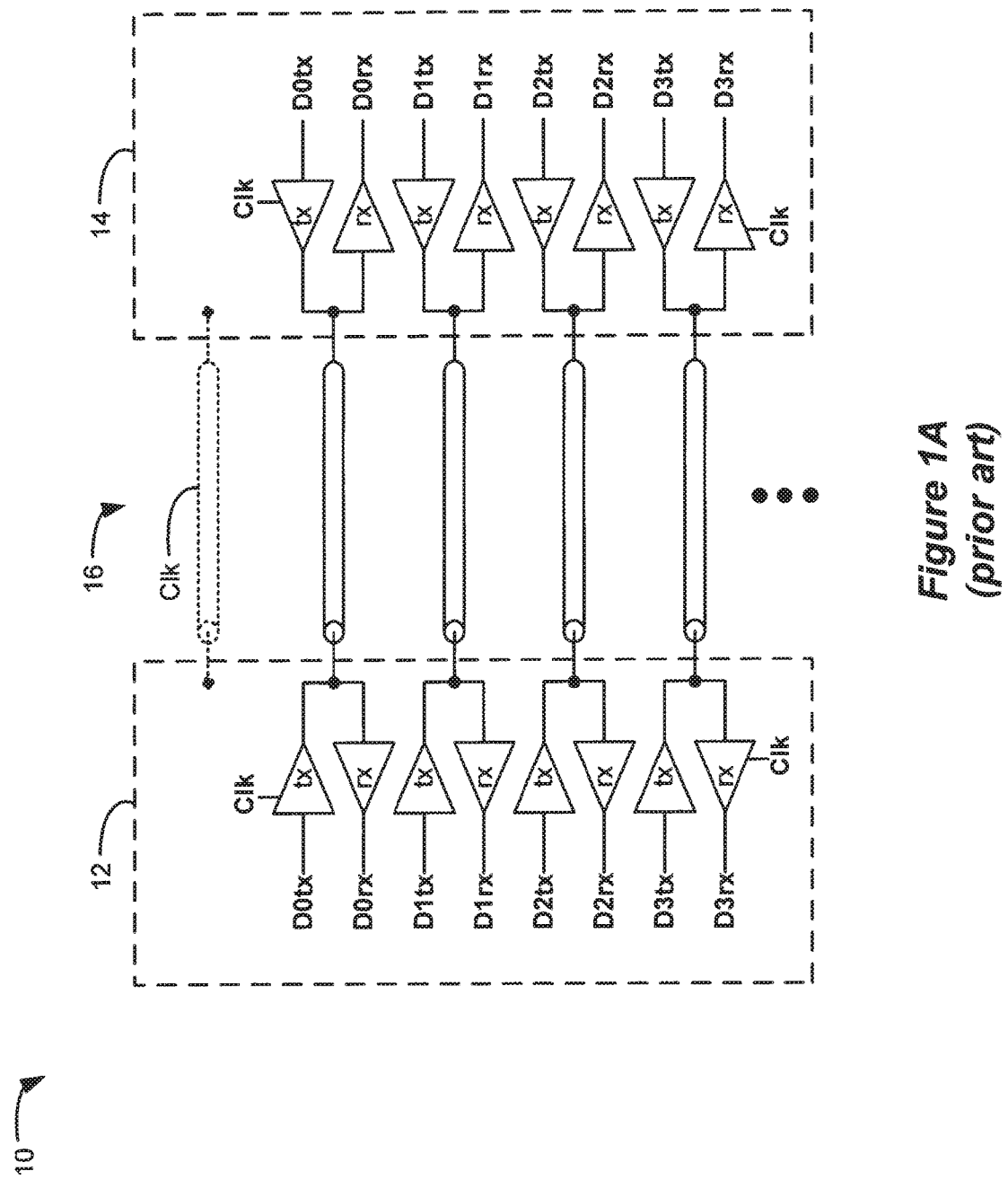
FIGS. 1A and 1B illustrate a standard interconnection approach for transmitting signals between two devices along a parallel bus.
Figure 1B:
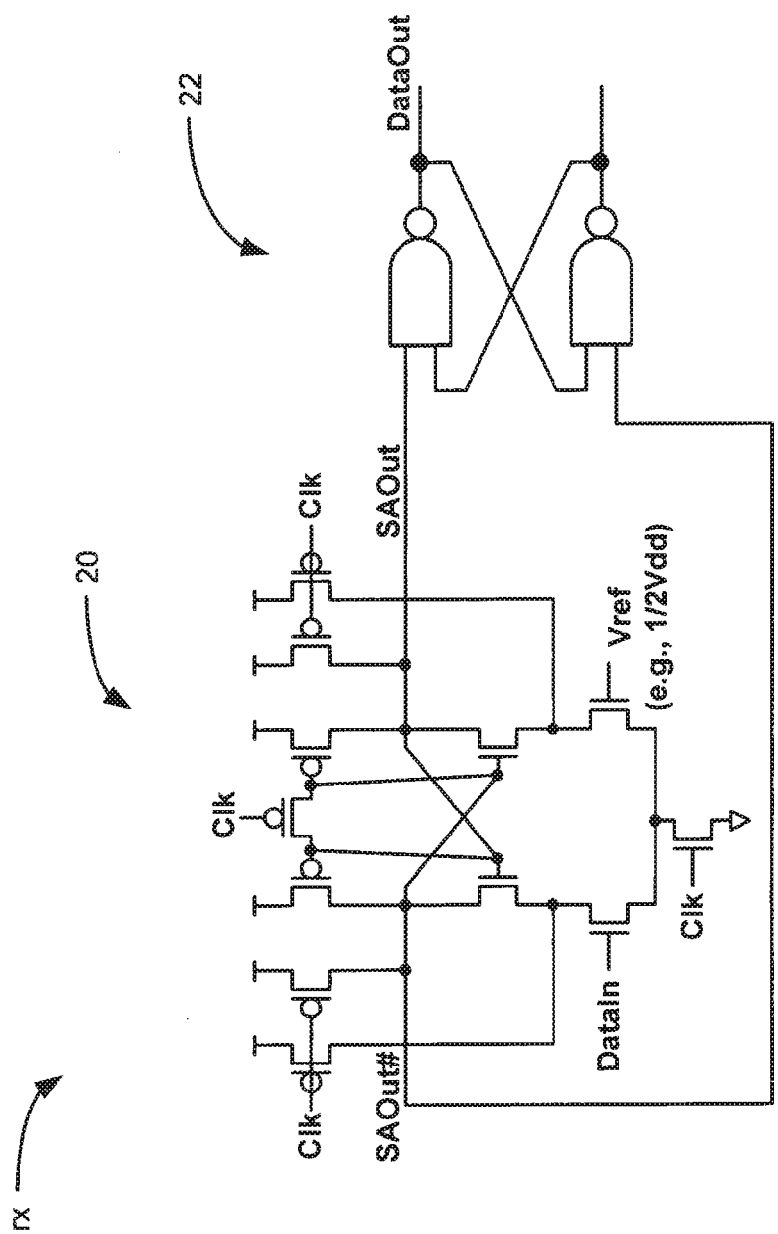
Figure 2A:
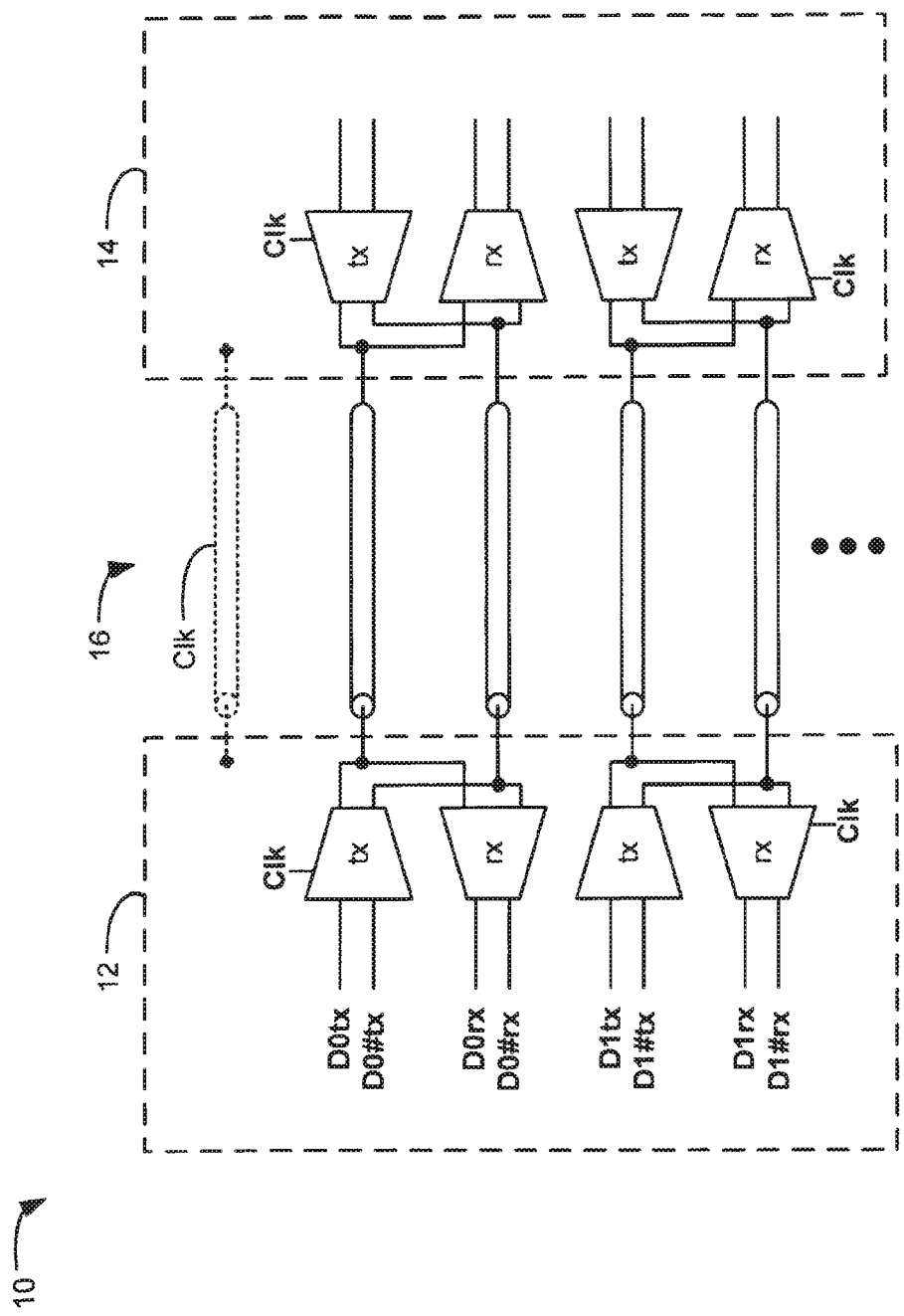
FIGS. 2A and 2B illustrate a differential interconnection approach for transmitting signals between two devices along a parallel bus.
Figure 2B:
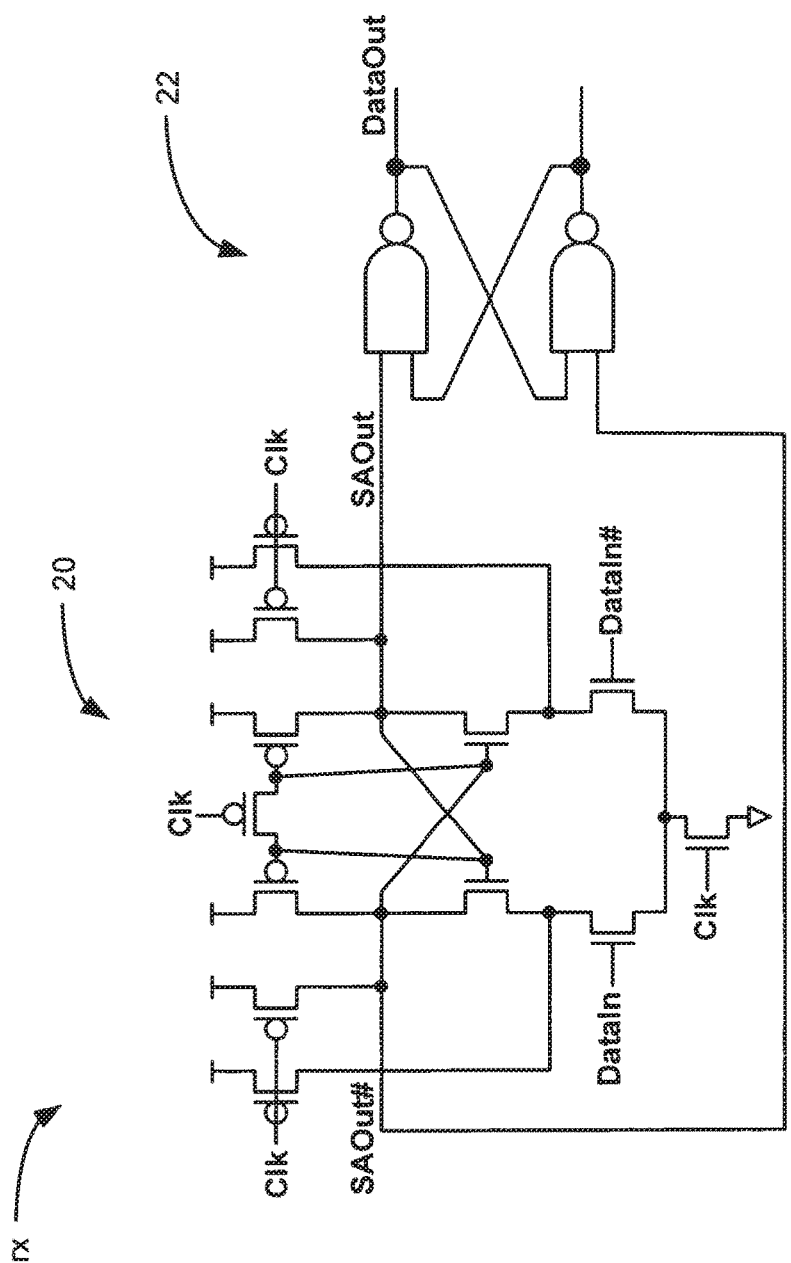

Consider a standard interconnect approach (FIG. 1A) in which data reception reliability at 5 Gigabits per second (Gb/s) is proving problematic. In a DDR application, in which data is triggered on rising and falling edges, this would comprise a clock speed of 2.5 GHz. One may wish to substitute the differential interconnect approach (FIG. 2A) to try and increase reliability as described earlier. However, as also described earlier, data capacity can only be preserved using the differential interconnect approach if a higher clock speed (i.e., at least double) is used.

Figure 5:
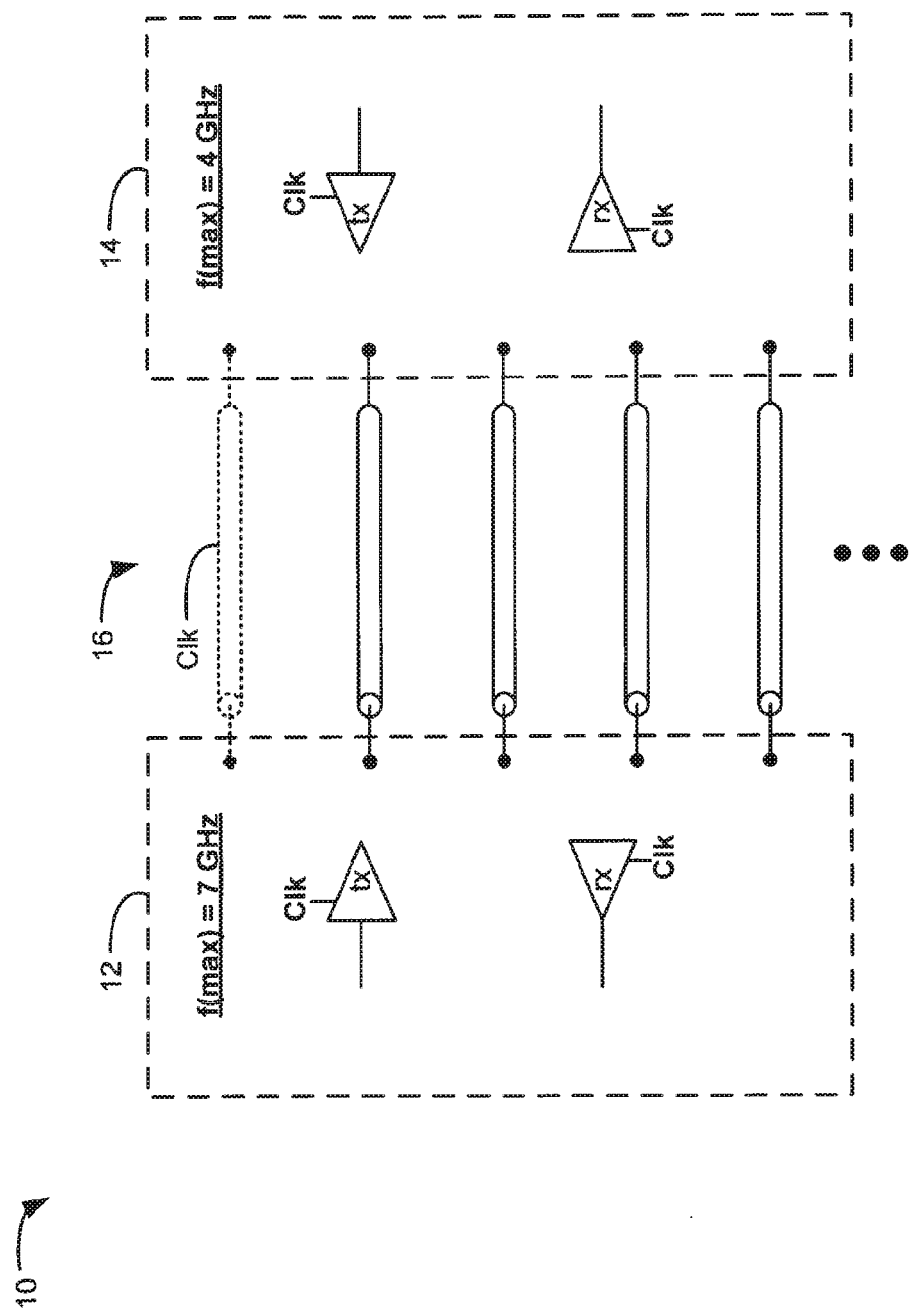
FIG. 5 illustrates a situation in which the disclosed asymmetric interconnection approach is particularly useful, such as when the devices involved are capable of different bandwidths.

Unfortunately, the use of a higher clock speed is not always possible. For example, consider FIG. 5, which depicts two devices 12 and 14 connected by channels 16 in a parallel bus, as illustrated earlier. Due to differences in the design and processing of the devices 12 and 14, the circuitry used in those devices may tolerate different maximum operating speeds. For example, assume that device 12 comprises a microprocessor or a memory controller, and assume that device 14 comprises a Synchronous Dynamic Random Access Memory (SDRAM). Because the processes used in the formation of the SDRAM 14 may be optimized to promote cell array operation (e.g., data retention), the transistors used to form the transition and reception circuitry may be non-optimal for high-speed applications. As a result, the maximum frequency of such circuitry, f(max), may be 4 GHz, for example. If so, a differential interconnect approach using a double-speed clock cannot be used, because this would require a 5 GHz clock, a value exceeding the maximum frequency, f(max)=4 GHz, of which the device 14 is capable. This limitation on clock speed can be unfortunate, especially when the process used to form the microprocessor or memory controller (hereinafter, "controller") 12 is generally optimized for higher operating speeds. For example, f(max) for the controller 12 might equal 7 GHz. If so, the controller 12 could participate in a 5 GHz differential interconnect approach, while the SDRAM 14 could not. Accordingly, the system depicted in FIG. 5 would be restricted to the standard interconnect approach, even though the controller 12 is capable of operating at higher frequencies.

To solve this problem, asymmetric signaling over the parallel bus of channels 16 can be used. For example, the channels 16 in the parallel bus can operate as standard interconnects for data travelling in one direction through the bus, and operate as differential interconnects for data travelling in the other direction through the bus. So that data capacity of the bus remains the same in both directions, the data rate during differential transmission can be twice that of the data rate during standard transmissions.

Figure 6A:
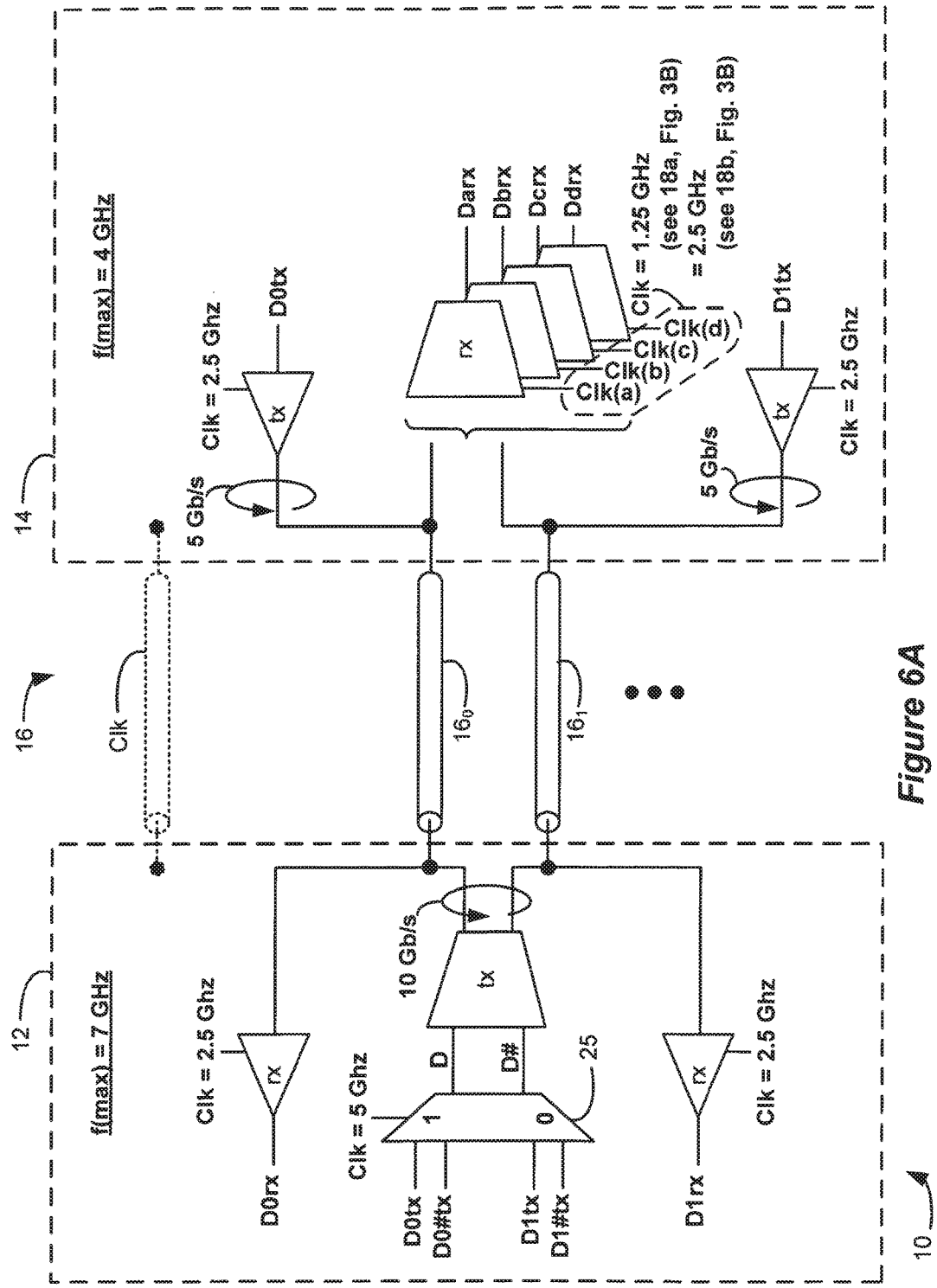
FIGS. 6A and 6B illustrate an embodiment of the asymmetric interconnection approach of the invention in which data is transmitted in standard fashion in one direction and in differential fashion in another direction.

One embodiment of this approach is shown in FIG. 6A. Shown are two channels $16_0$ and $16_1$ which, as just noted, can either carry standard or differential data, and which otherwise comprise just two of the channels in a bus comprised of a plurality of channels. Continuing with the above example, controller 12 is assumed to have a maximum operating frequency of 7 GHz, while SDRAM 12 is assumed to have a maximum operating frequency of 4 GHz. As illustrated, data transmission from the controller 12 to the SDRAM 14 occurs differentially at 10 Gb/s, while transmission from the SDRAM 14 to the controller 12 occurs non-differentially at 5 Gb/s. This is illustrated further in the timing diagram of FIG. 6B. As shown at top, transmission from the SDRAM 14 occurs in accordance with a standard interconnect approach, in which only true data is sent on the channels $16_0$ and $16_1$. By contrast, at bottom, which depicts transmission from the controller 12, true data and its complements are sent in parallel and at twice the rate. Although channel $16_1$ is shown as being dedicated to the complementary data, such data could also appear on channel $16_0$, or on both channels in an interleaved fashion. In any event, the data capacity in both directions remains the same across the channels 16 that comprise the bus. Once again, the clock, Clk, can be forwarded, generated by CDR, or differential as noted earlier.

Figure 6B:
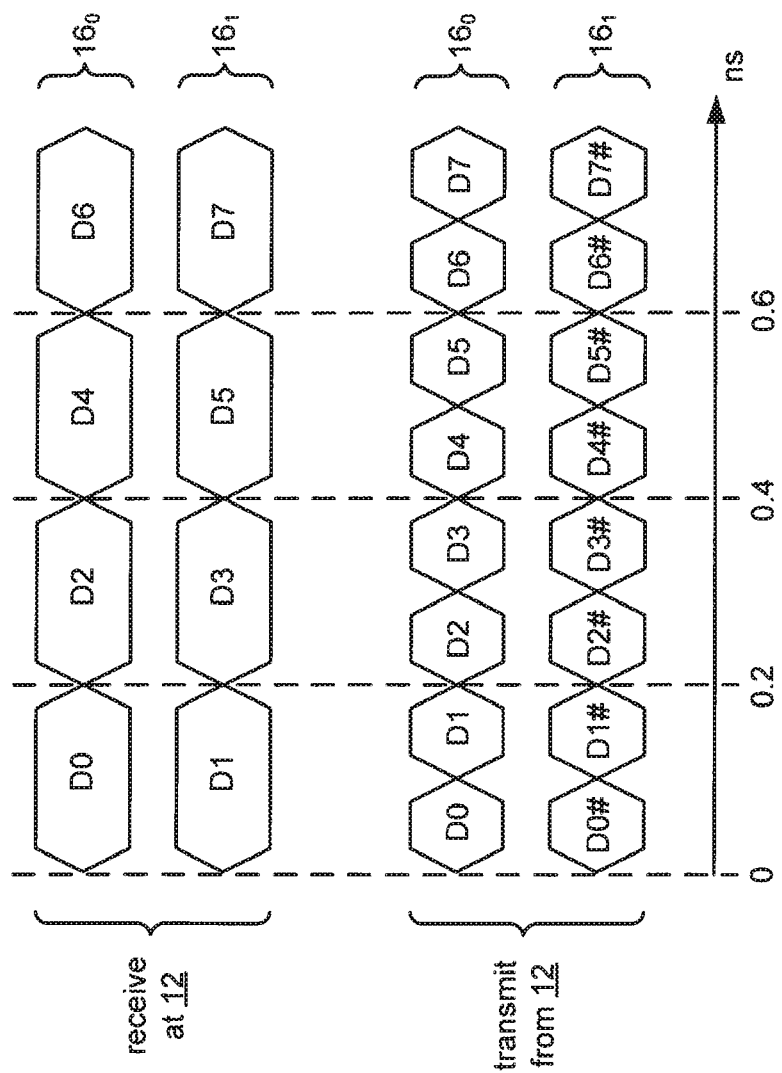

Example transmission and reception circuitry for achieving the timings of FIG. 6B is illustrated in FIG. 6A. As shown, the flow of data from the SDRAM 14 to the controller 12 employs standard interconnect approach hardware, with a transmitter (tx) and receiver (rx) being dedicated to each channel. Because as assumed data is to be transmitted at a rate of 5 Gb/s, clocks of 2.5 GHz are used in both the SDRAM's transmitters and the controller's receivers. However, multiphase, fractional-rate receivers could also be used in the controller 12 as well, which could drop the frequency of the clocks used as discussed previously with respect to FIG. 3B.

By contrast, the flow of data from the controller 12 to the SDRAM 14 employs a differential interconnect approach. Transmission starts by presentation of complementary data at a multiplexer 25. The multiplexer 25 is clocked by a 5 GHz clock, to pass either odd or even differential data to the differential transmitter, tx, in the controller 12. When the multiplexer clock is high, D0tx and D0tx# are sent to the transmitter, followed by D1tx and D1tx# when low, followed by D2tx and D2tx# when high again, etc. The effect is that true and complementary data are sent on each channel $16_0$ and $16_1$ at a rate of 10 Gb/s.

Stated another way, and assuming N channels are present, N data bits are transferred in parallel along the N channels from the SDRAM 14 to the controller 12 at 5 Gb/s, while N/2 data bits and their complements are transferred from the controller 12 to the SDRAM 14 at 10 Gb/s.

Figure 3A:
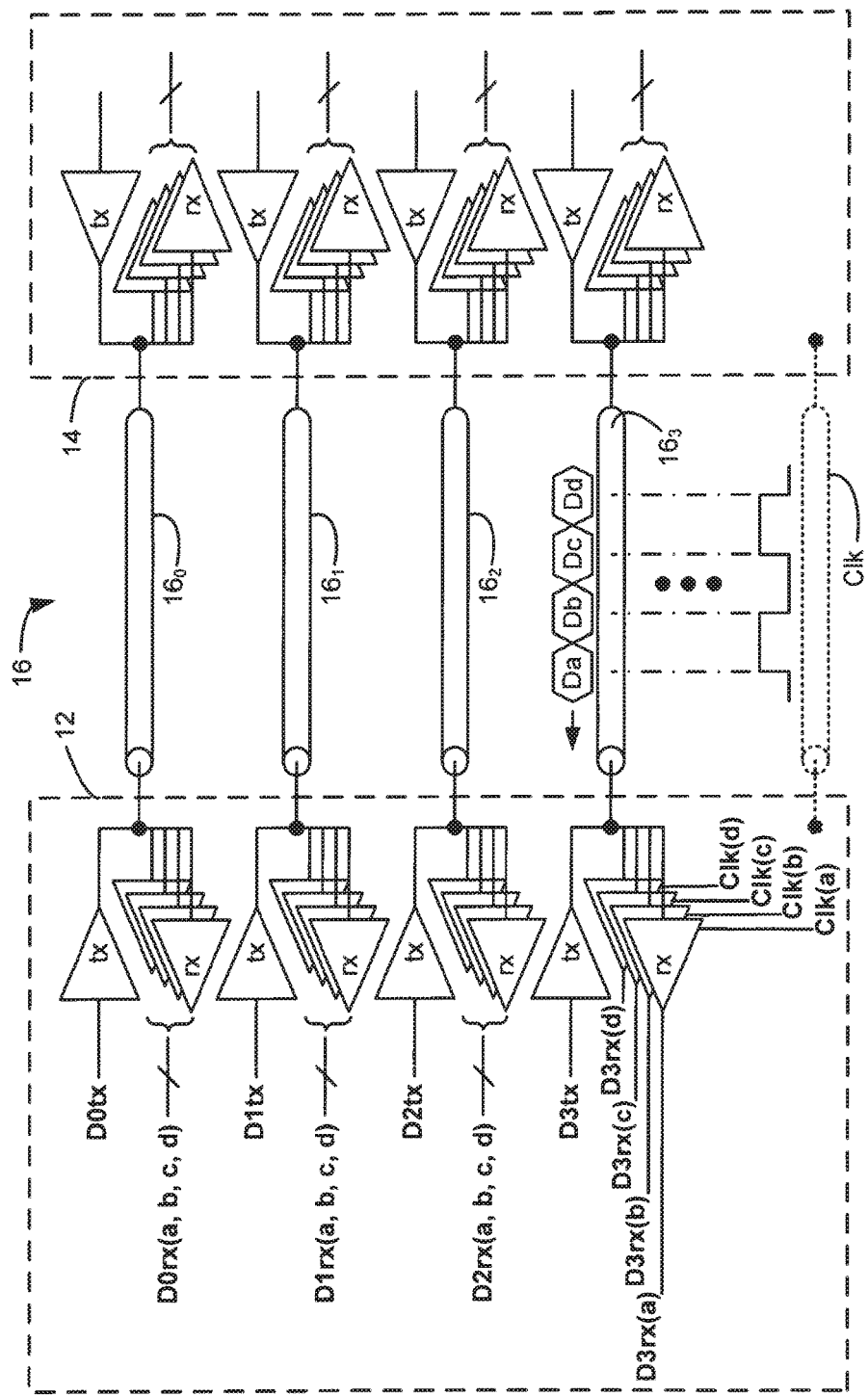
FIGS. 3A, 3B, and 4 illustrate the standard and differential interconnection approaches extended to include the use of multiphase, fractional-rate receivers.
Figure 3B:
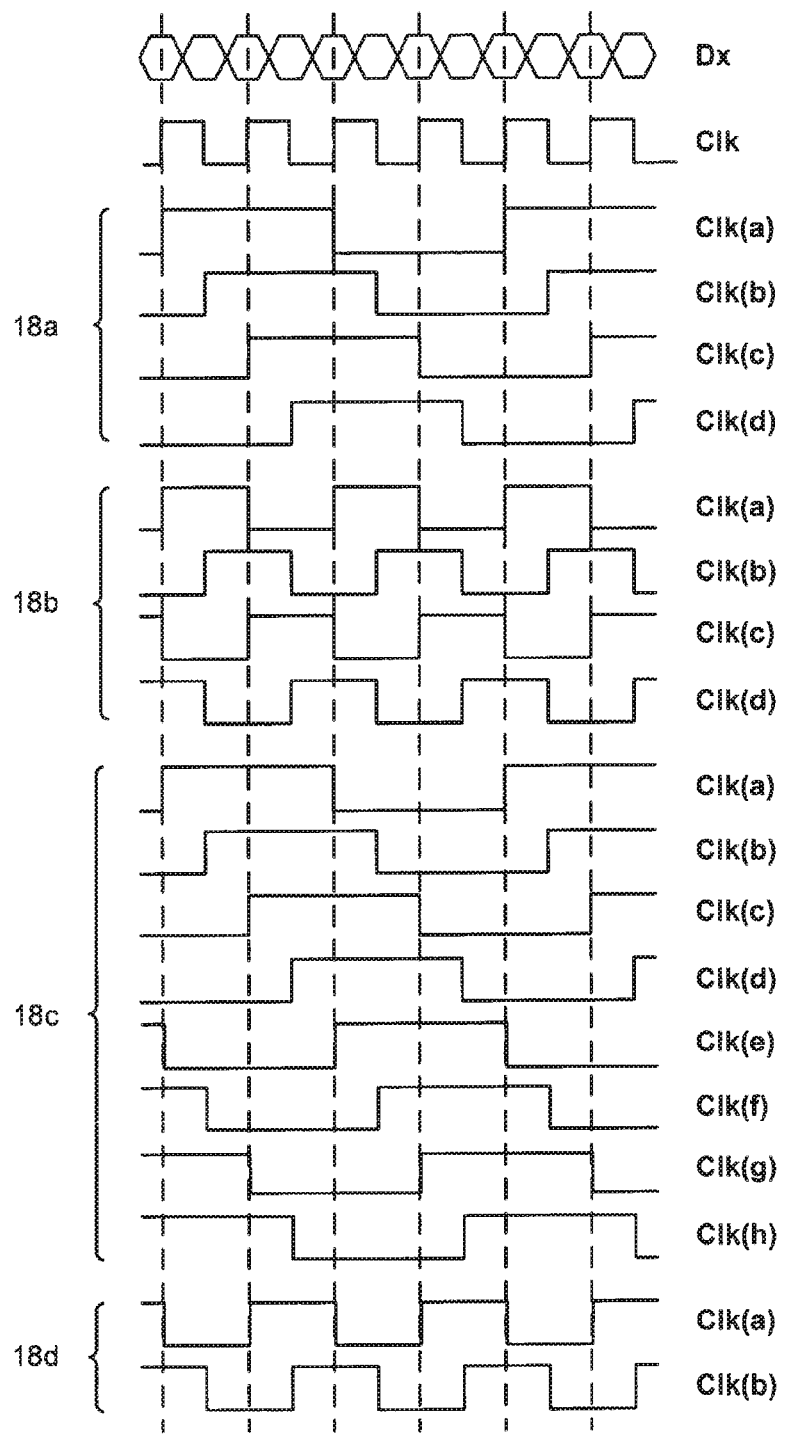
Figure 4:
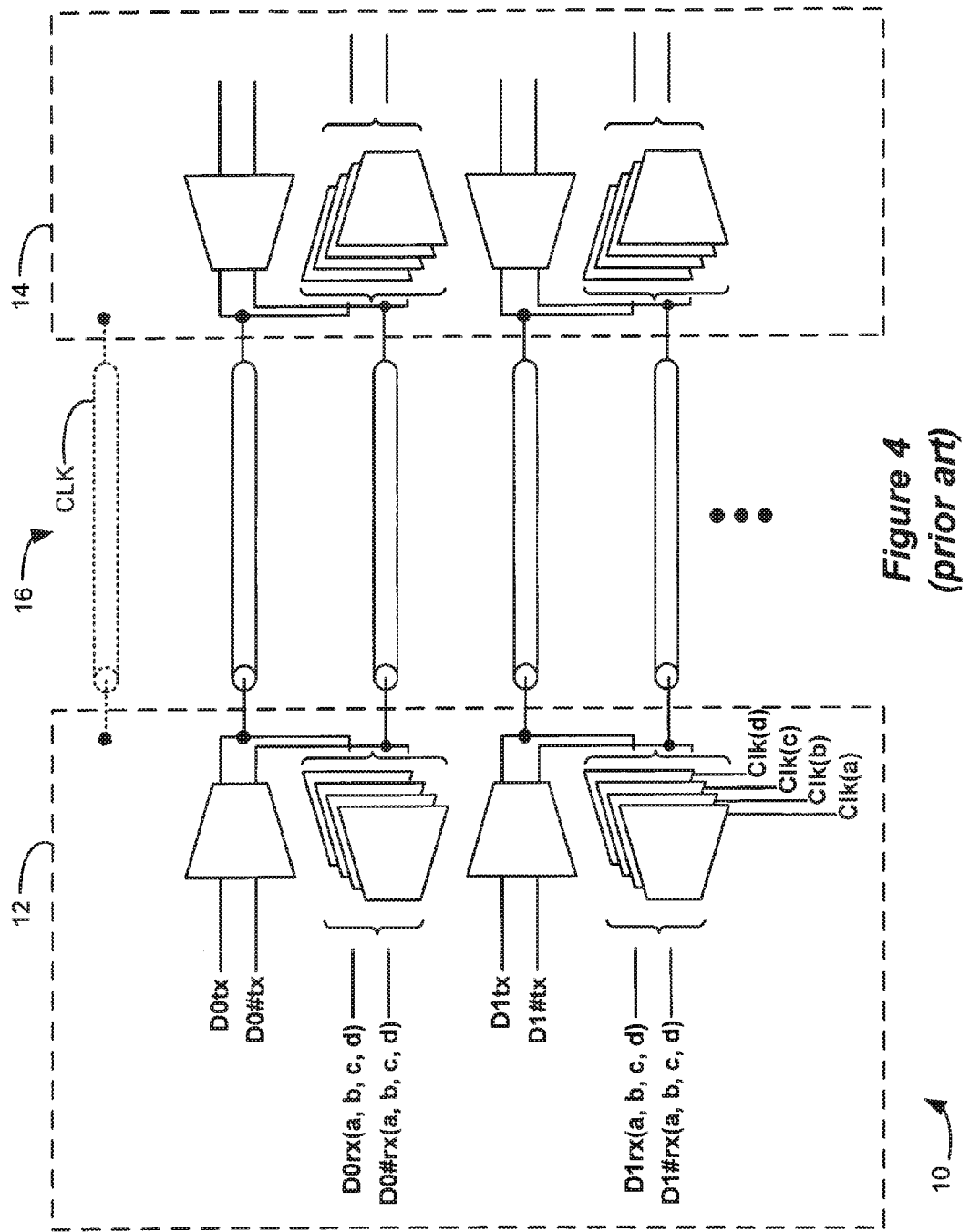

Reception of this data at the SDRAM is made using differential multiphase, fractional-rate receivers, such as was discussed with respect to FIGS. 3A, 3B, and 4 earlier. As before, four receivers are used, each clocked by phase-shifted, fractional-rate clocks, Clk(x). To appropriately sample the incoming data at 10 Gb/s, and assuming that sampling at the receivers occurs on rising and falling edges of the clock, a clock of frequency 1.25 GHz is used (see, e.g., 18a of FIG. 3B). However, if the clocks only sample data on their rising edges, clocks of 2.5 GHz could be used (18b of FIG. 3B). Although not shown in FIG. 6A, if eight receivers are used, eight clocks, each at 1.25 GHz, but sampling on only rising or falling edges (18c of FIG. 3B), could be used. Or, if two receivers are used, two clocks, each at 2.5 GHz, but sampling on both rising or falling edges (18d of FIG. 3B), could be used. These are just some examples of the various clocks and multiphase, fractional-rate receiver arrangements that could be used. Furthermore, and regardless of the sampling approach chosen, if a differential clock is used, the need to specifically generate a 180-degree phase shifted clock is unnecessary because it is already present, which can simplify clock generation.

The depicted example of FIG. 6A assumes a DDR approach in which data is sampled on the rising and falling edges of the master clock, Clk. However, it should be understood that the asymmetric interconnect approach of the invention is equally applicable to non-DDR approaches in which data is sampled on either the rising or falling edges of the master clock. In other words, the invention is not limited to DDR, DDR2, DDR3, etc. implementations.

Figure 7:
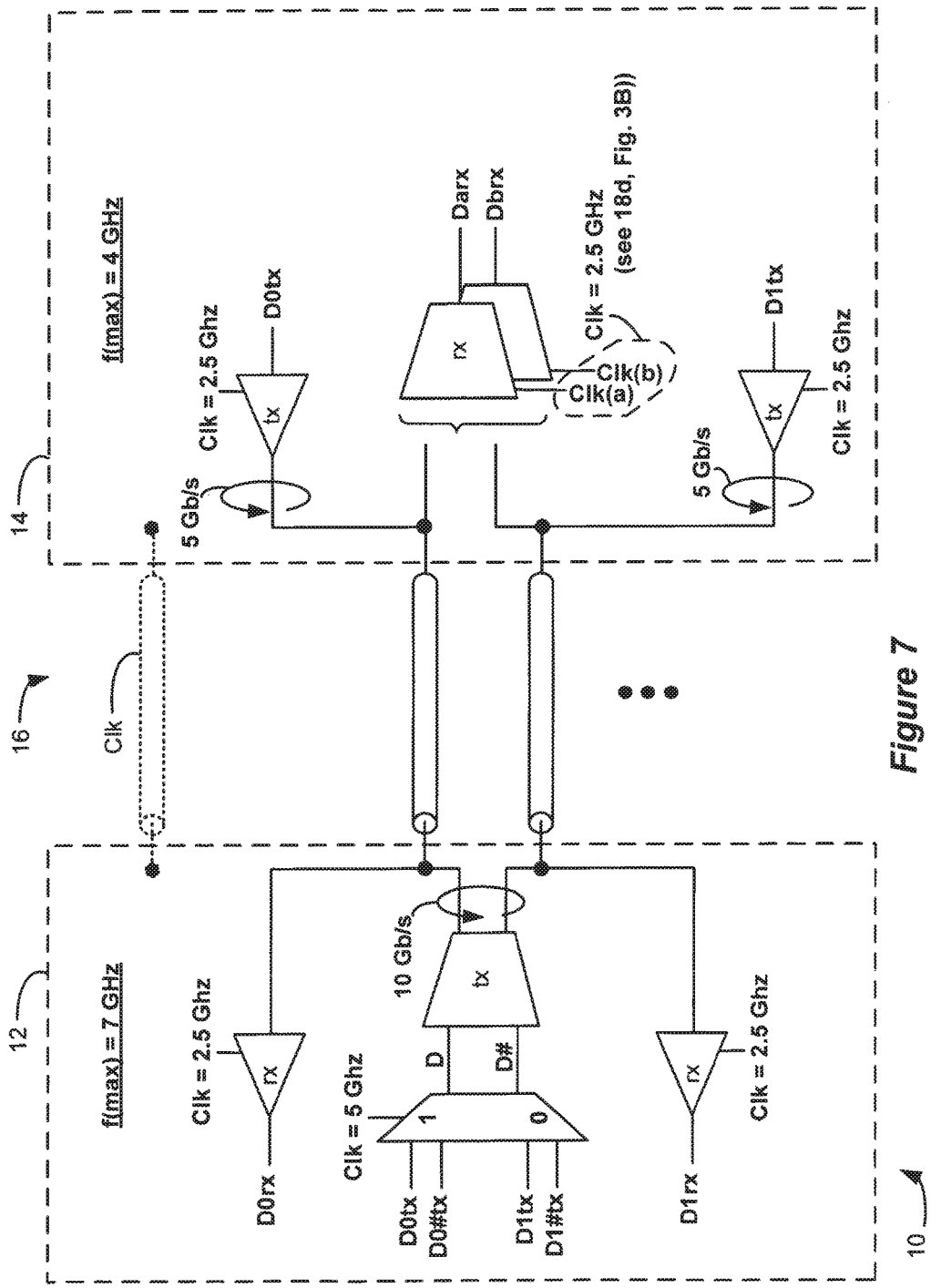
FIG. 7 illustrates an alternative embodiment of the asymmetric interconnection approach in which the number of fractional-rate receivers has been varied.

FIG. 7 shows alternative circuitry for implementing the asymmetric interconnect approach of the invention, and in this example only two fractional-rate receivers are used in the SDRAM 14. So implemented, the two receiver clocks, Clk(a) and Clk(b), can operate at 2.5 GHz to sample the 10 Gb/s coming from each of the channels $16_0$ and $16_1$, assuming that sampling occurs on both the rising and falling edges of the clocks (see 18d, FIG. 3B). While sampling could theoretically also occur using only the rising edges of the clocks as was discussed with reference to FIG. 6A, this would require 5 GHz clocks in the depicted example, which exceeds the maximum operating frequency (f(max)=4 GHz) assumed for the SDRAM 14. The point illustrated by this example is that while many different clocking schemes can be used at the multiphase, fractional-rate receiver in accordance with the invention, care should be taken to ensure that no clock is faster than that permissible for the SDRAM 14.

Regardless of the specific implementation chosen, the asymmetric interconnect approach should enhance the reliability of data transfer. As noted earlier, non-differential data transferred down standard interconnects can be susceptible to noise and crosstalk, and can suffer from poorer voltage margins at the receiver. In the embodiment discussed above, such standard reception occurs at the controller 12, which, by virtue of its higher quality transistors, is better able to handle and accurately resolve the transferred data; by contrast, the SDRAM 14 enjoys more reliable differential reception, which helps it to overcome the non-optimal nature of its reception circuitry. Moreover, these benefits can be established without exceeding the maximum operating frequencies, f(max) of either of the devices 12 or 14. Transmission from the SDRAM 14 to the controller occurs at 2.5 GHz, which does not exceed the maximum permissible frequency for either device. Transmission from the controller 12 occurs at a higher speed of 5 GHz, which is acceptable for that device, but sensing occurs at either 1.25 GHz or 2.5 GHz at the SDRAM 14, as assisted by the use of multiphase, fractional-rate receivers, which again is acceptable.

Although the disclosed asymmetric interconnect technique has been illustrated in the context of a system comprising a controller 12 and an SDRAM 14, it will be understood, by one skilled in the art, that the invention can be used with, and can benefit the communications between, any two integrated circuits or functional blocks, and is particularly useful in the situation where the two circuits have differing bandwidths, as has been illustrated.

Figure 8:
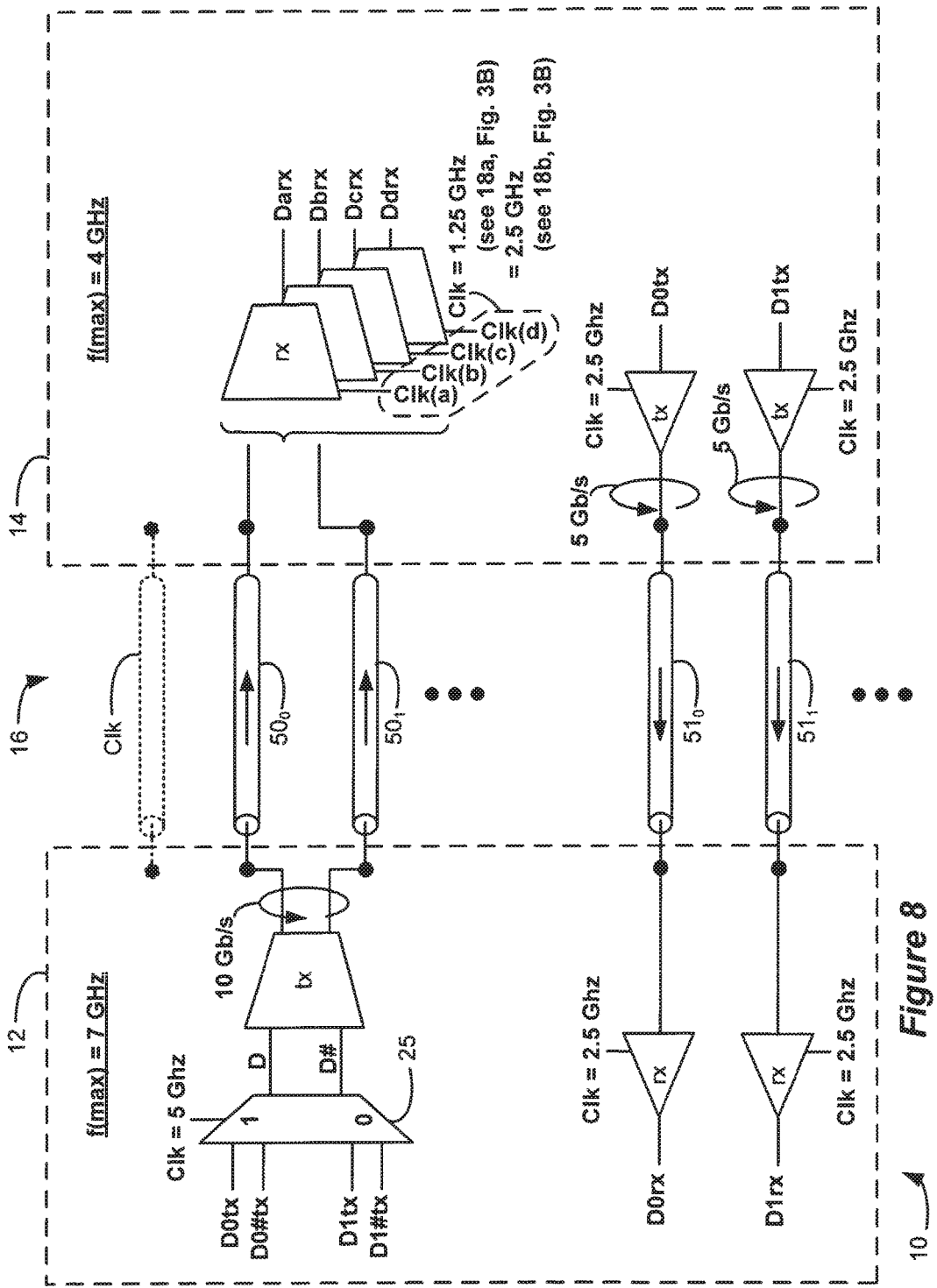
FIG. 8 illustrates an alternative embodiment in which asymmetric communications occur across two unidirectional busses.

Embodiments of the invention can also be employed in busses employing uni-directional signaling. In the embodiments shown to this point, each of the channels 16 in the bus have been bi-directional, i.e., they carry data from the controller 12 to the SDRAM 14 and vice versa. However, some high performance systems may employ unidirectional busses 50 and 51 between the two devices in the system, with each bus 50, 51 carrying data in only one direction, as shown in FIG. 8. As shown, bus 50 carries data from the controller to the SDRAM 14, while bus 51 carries data from the SDRAM 14 to the controller 12. In accordance with one or more embodiments of the invention, the data along the two busses are handled asymmetrically, with bus 50 carrying differential data, and bus 51 carrying non-differential data. Through this arrangement, each channel is coupled to only at least one receiver, or at least one transmitter on each device, but not both, and so data reception and transmission are decoupled at each of the devices 12, 14. When communications of the busses are implemented asymmetrically, the same benefits highlighted with respect to FIG. 6A should be achievable. Additionally, uni-directional signaling is advantageous in that each uni-directional channel is only loaded with a single transmitter and receiver at the respective ends of the channel as already mentioned, which reduces circuit-based parasitic loading of the channel and improves speed.

Further, note that it is not strictly required that the invention be used with integrated circuits coupled by interconnect channels, such as by a PCB. Instead, the invention can be used in communications between any two circuits which may be discrete or integrated on a common piece of semiconductor.

It should also be recognized that a "bit" of information need not be strictly binary in nature (i.e., only a logic '1' or logic '0'), but could also comprise other values (e.g., logic '½') or types of digits as well.

It should be understood that the disclosed techniques can be implemented in many different ways to the same useful ends as described herein. In short, it should be understood that the inventive concepts disclosed herein are capable of many modifications. To the extent such modifications fall within the scope of the appended claims and their equivalents, they are intended to be covered by this patent.

What is claimed is:

1. An apparatus, comprising:
    a first device coupled to a first channel and a second channel, the first device configured to operate at a first frequency and to transfer data at a first rate and receive data at a second rate, the first rate being different from the second rate, the first device including at least one differential receiver to receive a data bit and its complement on the first channel and the second channel, respectively; and
    a second device coupled to the first channel and the second channel, the second device configured to operate at a second frequency and to transfer data at the second rate to the first device and receive data from the first device at the first rate, the second frequency being different from the first frequency, the second device including at least one differential transmitter to transmit a data bit and its complement on the first channel and the second channel, respectively, wherein the second device is operable at a higher frequency than the first device.

2. The apparatus of claim 1, wherein the second rate is double the first rate.

3. The apparatus of claim 1, wherein the first device comprises a memory device and the second device comprises a controller.

4. The apparatus of claim 1, wherein the first device and the second device comprise integrated circuits.

5. The apparatus of claim 1, wherein the channels comprise traces on a circuit board.

6. The apparatus of claim 1, wherein the first device and the second de contained on the same integrated circuit.

7. The apparatus of claim 1, wherein the first device further comprises:
    at least one second non-differential transmitter coupled to the second channel; and
    at least one differential receiver to receive a data bit and its complement on the first channel and the second channel, respectively.

8. The apparatus of claim 1, wherein the second device further comprises:
    at least one first non-differential receiver coupled to the first channel; and
    at least one second non-differential receiver coupled to the second channel.

9. The apparatus of claim 1, wherein the at least one differential receiver comprises a plurality of multiphase, fractional-rate receivers.

10. The apparatus of claim 9, wherein the at least one differential transmitter is to operate at a first frequency, and wherein each of the plurality of multiphase, fractional-rate receivers is to operate at a second frequency less than the first frequency.

11. The apparatus of claim 1, further comp at least one clock channel coupled between the first device and the second device.

12. A method comprising:
    transferring first data at a first rate from a first device operating at a first frequency to a second device operating at a second frequency, the first data comprising true data to be transferred in parallel along a first channel;
    transferring second data from the second device to the first device at a second rate different from the first rate, the second data comprising true data and corresponding complementary data along the first channel and a second channel, respectively;
    transferring the true data of the second data along at least one of a third channel and a fourth channel with corresponding complementary data being transferred in parallel along the other of the third channel and the fourth channel that is not transferring the true data; and
    receiving a data bit and its complement on the first channel and the second channel, respectively, by at least one differential receiver at the first device.

13. The method of claim 12, further comprising transmitting a data bit and its complement on the first channel and the second channel, respectively, by at least one differential transmitter at the second device.

14. The method of claim 12, further comprising transmitting a clock signal between the first device and the second device.

15. A memory controller, comprising:
    a first terminal and a second terminal;
    a first receiver including an input coupled to the first terminal, the first receiver configured to operate at a first frequency and to transfer data at a first rate and receive data at a second rate, the first rate being different from the second rate, the first receiver including at least one differential receiver to receive a data bit and its complement on the first channel and the second channel, respectively;
    a second receiver including an input coupled to the second terminal;
    a transmitter including a first output coupled to the first terminal and a second output coupled to the second terminal; and
    a multiplexer to receive first data having non-complementary data and complementary data and second data having non-complementary and complementary data and configured to send the first data and the second data to the transmitter;
    wherein each of the first receiver and the second receiver is to be operated at a first clock frequency and the multiplexer is to be operated at a second clock frequency different from the first clock frequency.

16. The memory controller of claim 15, wherein each of the first receiver and the second receiver comprises an amplifier including a first input to receive a data and a second input to receive a reference voltage, and the transmitter comprises an amplifier including the first output to output non-complementary data and the second output to output complementary data.

* * * * *